United States Patent
Bouten et al.

(10) Patent No.: US 7,134,582 B2
(45) Date of Patent: Nov. 14, 2006

(54) SUBSTRATE AND METHOD OF SEPARATING COMPONENTS FROM A SUBSTRATE

(75) Inventors: Petrus Cornelis Paulus Bouten, Eindhoven (NL); Frederik Hendrik In't Veld, Eindhoven (NL); Roger Maria Helmut Godfried Wehrens, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 214 days.

(21) Appl. No.: 10/478,737

(22) PCT Filed: May 27, 2002

(86) PCT No.: PCT/IB02/01923

§ 371 (c)(1),
(2), (4) Date: Nov. 24, 2003

(87) PCT Pub. No.: WO02/096612

PCT Pub. Date: Dec. 5, 2002

(65) Prior Publication Data

US 2004/0144824 A1    Jul. 29, 2004

(30) Foreign Application Priority Data

May 29, 2001   (EP)   ................... 01202030

(51) Int. Cl.
*B26F 3/00*   (2006.01)
*H01L 21/78*   (2006.01)

(52) U.S. Cl. ............................ 225/2; 225/96; 438/462
(58) Field of Classification Search .................. 225/2, 225/96, 96.5; 83/33; 438/462
See application file for complete search history.

(56) References Cited

U.S. PATENT DOCUMENTS

| 4,247,031 A | | 1/1981 | Pote et al. ..................... 225/2 |
| 5,128,282 A | * | 7/1992 | Ormond et al. ............... 438/68 |
| 5,132,252 A | * | 7/1992 | Shiraiwa et al. ............ 438/703 |
| 5,496,777 A | * | 3/1996 | Moriyama .................. 438/703 |
| 5,786,266 A | * | 7/1998 | Boruta ........................ 438/462 |
| 6,114,072 A | * | 9/2000 | Narimatsu ..................... 430/5 |
| 6,218,263 B1 | * | 4/2001 | Chung et al. ................ 438/401 |

FOREIGN PATENT DOCUMENTS

JP    2-36094    *    2/1990

\* cited by examiner

*Primary Examiner*—Kenneth E. Peterson
*Assistant Examiner*—Omar Flores Sanchez
(74) *Attorney, Agent, or Firm*—Aaron Waxler; Paul Im

(57) ABSTRACT

A substrate (1) having a first groove (4) is provided with a protrusion (3) on the first groove (4). This protrusion (4) preferably has a top with an apex angle of 30 to 150 degrees and results in a controlled breaking of the substrate (1) and a minimum of loss due to deviations of the crack initiated at the protrusion (4).

8 Claims, 2 Drawing Sheets

SUBSTRATE AND METHOD OF SEPARATING COMPONENTS FROM A SUBSTRATE

The invention relates to a substrate with a first and a second side, which substrate is provided at its first side with a first groove having a depth with respect to the first side.

The invention also relates to a method of separating components from a substrate with a first side and a second side, comprising the steps of providing a first groove at the first side and breaking the substrate along said first groove.

The invention further relates to an electronic component provided with a carrier.

Such a method and such a substrate are known from U.S. Pat. No. 4,247,031. The known substrate is a silicon wafer with a first side. At this first side, the substrate is provided with a first, a second, a third, and a fourth groove, the first and the fourth groove and the second and the third groove being mutually oriented in parallel. The grooves are provided at a second side which is provided with components. The grooves are formed by a mechanical method or by writing or incising with a laser in the known method. For breaking, the substrate is covered with a flexible plate on which a pressure is subsequently exerted. It is a disadvantage of the known method that fracture surfaces may arise in locations where no groove is provided. The result of this is that a considerable number of the individual components do not fall within the tolerance requirements as regards their dimensions.

It is accordingly a first object of the invention to provide a substrate of the kind mentioned in the opening paragraph which is less prone to develop deviating fracture surfaces.

It is a second object of the invention to provide a method of the kind mentioned in the second paragraph which leads to a smaller yield loss owing to non-compliance with the dimensional tolerance requirements.

It is a third object of the invention to provide an electronic component of the kind mentioned in the third paragraph whose carrier was separated from the substrate according to the invention.

The first object is achieved in the substrate according to the invention in that the first groove has a protrusion in an initiation point. The second object is achieved in the method according to the invention in that the substrate according to the invention is used.

When a pressure is exerted on the substrate according to the invention, a pressure difference will arise between the protrusion and the first groove. Owing to this an initiation of a fracture takes place in the initiation point which was previously defined. The fracture will then develop into a fracture surface which is substantially planar and substantially perpendicular to the first side of the substrate. This takes place from the initiation point in two mutually opposed directions along the first groove.

The protrusion may be, for example, conical or block-shaped, but may alternatively have rounded edges. In the case of a block-shaped protrusion, the ratio between the height of the protrusion—measured from the first groove—and the width—measured in the first groove—is preferably greater than 0.5, more preferably greater than 1.0.

It is preferred, however, that the protrusion has a top which encloses an apex angle of between 30 and 150 degrees. A first advantage of a protrusion with such a top, such as a chevron-notch structure, is that the initiated cracks are comparable. This promotes that these cracks will reach a certain depth at which the crack is stable in the sense that there is a homogeneous breaking stress. It is also promoted thereby that the cracks continue evenly up to a barrier. Such a barrier is, for example, a local deepening of the grooves, for example at the area of an intersection between the first and a second groove.

The protrusion with a top is of importance especially when there are several protrusions on a groove. In that case the pressure is no longer concentrated in one point, with the result that a crack may easily deviate from the plane of the first groove. Such a deviation is undesirable and should be prevented. It was found that protrusions with a top having an apex angle of between 30 and 150 degrees are capable of ensuring this. This type of protrusion leads to a sufficient concentration of pressure for initiating a crack in the initiation point and having it propagate in the plane of the first groove.

The substrate according to the invention may be broken up in accordance with various patterns. It may be that it is divided into two parts along the first groove into two separate components or groups of components. A first example of this is that the separated component is an LCD screen. A second example of this is that the separated group of components is a strip on which a plurality of passive or active components are present. The strip may be subdivided into individual components in a later stage.

In an alternative embodiment, the substrate according to the invention comprises components which are surrounded by mutually intersecting grooves. It is true in that case that the substrate is provided at its first side with a second and a third groove, each having a depth with respect to the first side, such that the first groove intersects the second and the third groove in a first and a second point of intersection, respectively, while the initiation point lies between the first and the second point of intersection. To realize a good fracture in this embodiment, the grooves are deepened further down to a depression depth in the first and the second point of intersection.

Experiments with this embodiment of the substrate have shown that no further cracks develop between the initiation point and the points of intersection. The greater depth in the first and the second point of intersection considerably retards the crack, or even causes the crack formation to stop all together. If two initiation points are present on a groove on either side of a point of intersection, cracks will run from the two initiation points to the point of intersection, which will then strongly retard any further formation of cracks. Now if said cracks do not propagate with exactly the same speed, this delay will prevent a crack from running across a point of intersection. The delay will be such that the second crack in the meantime has also reached the point of intersection. There will be a continuous crack at that moment. The probability that the crack will issue into the fracture already formed is very high.

A crack, however, in principle does not propagate only in the direction parallel to the first side of the substrate, but also in the direction perpendicular thereto. This propagation takes place with increasing speed in the direction perpendicular to the first side of the substrate, which speed is deemed to be dependent on the load applied and the manner of loading. In addition, this speed seems to be in general dependent on the speed in the direction parallel to the first side of the substrate. It is accordingly preferred that the depression depth in the first and the second point of intersection is at least one and a half times the depth of the first groove. It is furthermore favorable when the depression depth is at least equal to half the thickness of the substrate. It is not necessary, however, as those skilled in the art will understand, that the depression depth in the first point of intersection is substantially equal to that in the second point of intersection.

It is an advantage of the greater depth in the points of intersection that the risk of breaking-off of corners during breaking along the second groove is considerably reduced. This directly leads to an increase in the yield. It is a further advantage that the greater depth reduces the influence of pores. According to the inventors' theory, pores can adversely affect the breaking process if there is no substantial pressure difference along the first groove. The depression depth does provide such a pressure difference.

In an advantageous embodiment, the first groove has several protrusions between the first and the second point of intersection. It was surprisingly found that the presence of more than one protrusion between two points of intersection nevertheless leads to a fracture along the desired fracture surface. The inventors have the theory, without wishing to be bound thereto, that only one of the protrusions acts as an initiation point. The propagation of the crack could then be so fast that no second initiation can take place between the first and the second point of intersection. On the other hand, however, it cannot be excluded that two cracks come together in the groove and then propagate jointly. This seems to be the case in particular when the number of protrusions is so great that the first groove in fact has a sawtooth structure between the first and the second point of intersection. The advantage of this embodiment is that the groove is found to be easier to manufacture as the number of protrusions increases. A small quantity of material is removed each time in the manufacture of the groove by means of laser ablation. The laser is then moved relative to the substrate with a certain step size. The step size may be chosen to be greater for the manufacture of a groove with several protrusions than in the case in which only one protrusion is present.

In the embodiment having a single protrusion, the distances from the initiation point to the first point of intersection and to the second point of intersection are approximately equal. The risk of cracks propagating across a point of intersection is limited thereby. In addition, this embodiment renders possible a greater length for a given, desired yield. The risk of deviation of a crack with respect to the groove increases in proportion as a crack becomes longer.

In a further embodiment, the depth of the first groove is less than 25% of the thickness of the substrate. More preferably, the substrate comprises the amorphous material, and the depth of the first groove is less than 20% of the thickness and, even more preferably, less than 10% of the thickness. It was found that the substrate according to the invention can be broken up with a sufficient yield even if the depth of the first groove is small. This small depth has the advantage that components can be placed more closely together. This is because a smaller depth also gives the groove a smaller width. Previously, a groove was provided in a substrate by means of laser ablation such that the distance between components was approximately 150 µm. A distance of approximately 35 µm is obtainable, and has been realized, in the substrate according to the invention. The distance between components is indeed less than 150 µm in the case of grooves provided by some other methods, but these methods have other disadvantages. An example of this is the method by which a scratched groove is provided in a substrate by means of a diamond pin. The crack is initiated in the groove in this method. Disadvantages of this, however, are that the method is slower and that the risk of deviations from the desired fracture surface is greater.

The substrate may comprise a brittle, inorganic breaking material or a brittle, organic breaking material. Examples of such inorganic materials are inter alia amorphous materials such as alumina and glass, crystalline materials such as sapphire, quartz, and silicon, and furthermore ceramic materials, such as those based on barium titanate. Electrodes may be present in the substrate, such as, for example, in a low-temperature co-firing ceramic substrate or LTCC substrate.

The grooves may be provided in such brittle materials by techniques such as powder blasting, laser ablation, and anisotropic ion etching. In ceramic materials, the grooves may furthermore be provided prior to sintering by means of slurry casting.

Brittle breaking organic materials are, for example, engineering materials and other polymeric materials which are in the glass state or are partly crystalline. Organic materials which comprise fillers may also be used. Processing techniques for such organic materials are inter alia laser ablation and injection molding.

It may be that the substrate is only separated into strips with components by the method according to the invention, which strips are further separated after further operations. It is furthermore possible that there is not just one component, but that there are several components between the first and the second groove.

The substrate according to the invention including the grooves may be supplied to a manufacturer of the components for component manufacture. This manufacturer then has the choice of either providing the components at the first side, where the grooves are present, or at the second side. If a manufacturer starts with a substrate without grooves, the grooves may be provided prior to the provision of the components or afterwards. If the grooves are provided after the components, it is preferred that the components are provided at the second side, so as to prevent pollution of the components during the manufacture of the grooves.

It is preferred in the substrate according to the invention that the first and the third groove are substantially at right angles to one another. The risk of a crack propagating across the point of intersection of the grooves is smaller then. Alternatively, if the first and the third groove enclose an angle which is not 90°, it is preferred that the depression depth in the point of intersection is equal to the thickness of the substrate. That is to say that there is an opening from the first to the second side of the substrate. An example is an angle of approximately 120°, which leads to components having a hexagonal base surface. Such a strong depression is desirable for stopping the crack at the point of intersection.

Among the individual components that can be separated by the method according to the invention are resistors, capacitors, integrated circuits, transistors, diodes, networks of passive components, and displays. Furthermore, an individual component may be a module on which a variety of components is provided.

Breaking-off of the substrate takes place in a known manner in the method according to the invention. For example, the substrate is placed on a supporting plate, such as a steel plate with a thickness of 1 mm. The substrate is covered with a coating or is fixed to the supporting plate with glue, which is removed again after separation. The coating is substantially less rigid than the supporting plate. Bending of the supporting plate causes a one-sided elastic load on the substrate which is substantially perpendicular to the grooves. The presence of an elastic load over the entire surface of the substrate prevents the formation of edges. It is preferred to apply a bending load to the substrate. A bending load has the advantage over a tensile load that the speed of propagation of the crack remains approximately the same with an increasing depth. It can be theoretically explained thereby that a stress profile arises which drops with an increasing depth. A bending load with only tensile components is preferred, in particular if several initiation points are present between two protrusions. The speed of propagation is further reduced with such a bending load.

Alternatively, the method according to the invention may be carried out in that the stack formed by the supporting plate, the substrate, and the coating is placed between a first roller and a second roller, the first roller being more rigid than the second roller and having a smaller diameter. The second roller of greater diameter is preferably arranged at the side of the coating in this case.

These and other aspects of the substrate and the method according to the invention will be explained in more detail below with reference to drawings, in which.

Figure 1:
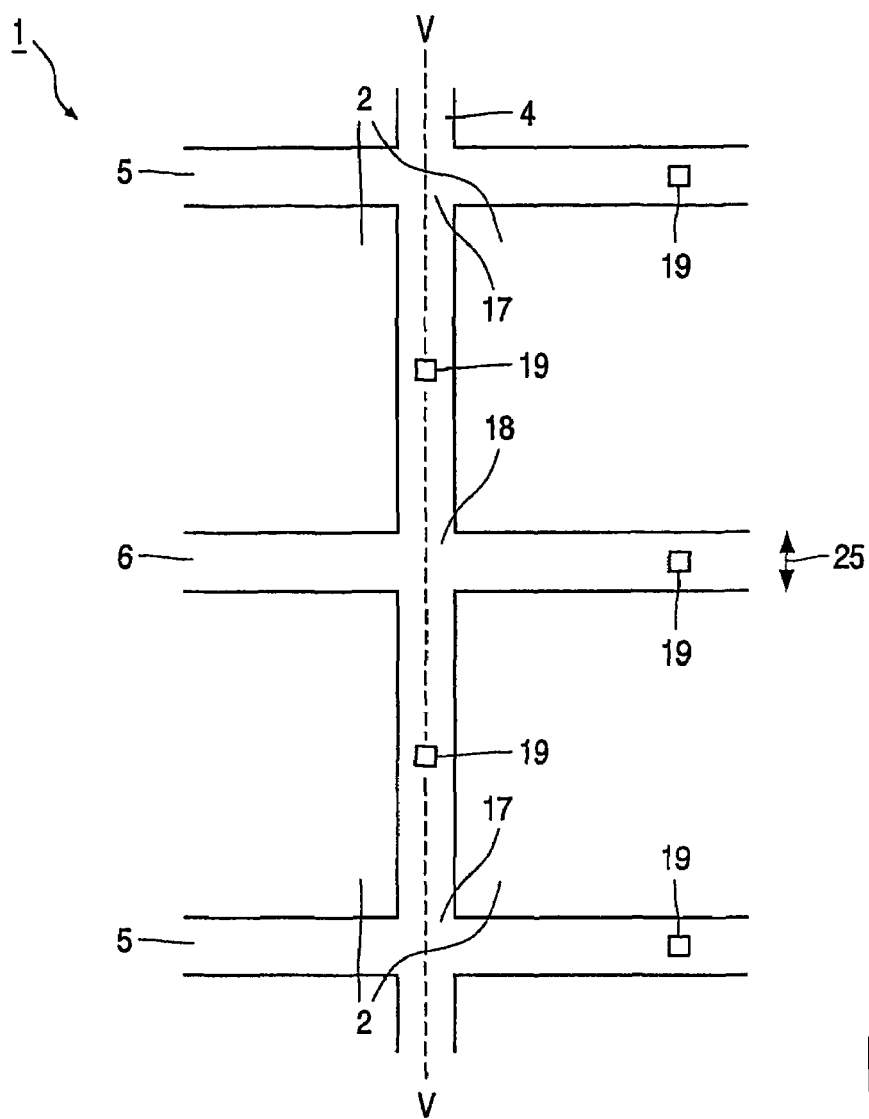
FIG. 1 is a plan view of a first embodiment of the substrate.

The Figures are diagrammatic and not true to scale, and corresponding components have been given the same reference numerals. It will be obvious to those skilled in the art that alternative, but equivalent embodiments of the invention are possible without departing from the essence of the invention, and that the scope of protection of the invention is limited by the claims only.

Embodiment 1

Figure 2:
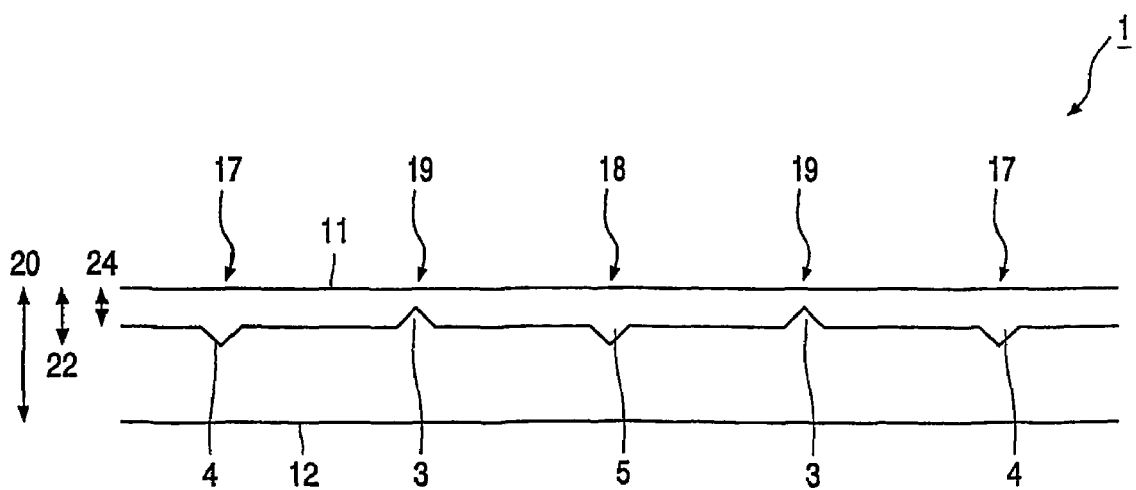
FIG. 2 is a cross-sectional view of the first embodiment taken on the line V—V in FIG. 1.

FIG. 1 and FIG. 2 show part of a substrate 1 in plan view and in cross-section. The substrate 1 has a first side 11 and a second, opposed side 12 and has a thickness 20 of 1.87 mm. The elements 2 are formed at the first side 11 of the substrate 1. The elements 2 in this example are light-emitting diodes, but they may alternatively be, for example, transistors, integrated circuits, passive components, or networks of passive components. The substrate 1 in this case comprises a glass on which elements 2 are formed in a usual manner. The elements 2 each comprise, for example, a first electrode comprising indium-tin oxide, a layer of an electroluminescent material such as polyethylene-vinylene, an intermediate layer, and a second electrode of Al. The elements 2 are normally separated from one another by strips of untreated material. The substrate 1 is subdivided into parts during the separation of the elements 2. To achieve this separation, grooves 4, 5, 6 are provided in the substrate 1, in this example in the first side 11 of the substrate 1. The grooves 4, 5, 6 are provided by means of, for example, a YAG laser of 5 W which emits radiation pulses with a wavelength of 1.06 µm at a frequency of 25 kHz. The radiation has the form of a beam of 16 mm diameter which is aimed at the substrate 1 by means of an optical system. The substrate 1 is moved with respect to the radiation along the grooves 4, 5, 6 to be formed during this, in this example with a speed of approximately 25 cm per second, during which certain points corresponding to the initiation points 19 to be created are skipped. Protrusions 3 are thus created in these locations. The first grooves 4 intersect the third grooves 5 in points of intersection 17. The first grooves 4 intersect the second grooves 6 in points of intersection 18. The grooves 5, 6 are deepened down to a depression depth 22 in the points of intersection 17, 18. The depression may extend over part of the second and third grooves 5, 6 and is provided in an aftertreatment by the laser.

The first grooves 4 and the second and third grooves 5, 6 enclose mutual angles of substantially 90° in this example. The grooves 4, 5, 6 each have a depth 24. This depth 24 is constant in the present example and is equal to 0.32 mm for each of the grooves 4, 5, 6. The depression depth 22 is, for example, 1.29 mm. The protrusions 3 have a height of, for example, 0.17 mm with respect to the depth 24 of the grooves 4, 5, 6. This corresponds to a depth of 0.15 mm with respect to the first side 12 of the substrate 1. The grooves 4, 5, 6 have a width 25 of 0.75 mm at the first side 11 of the substrate 1.

Embodiment 2

Figure 3:
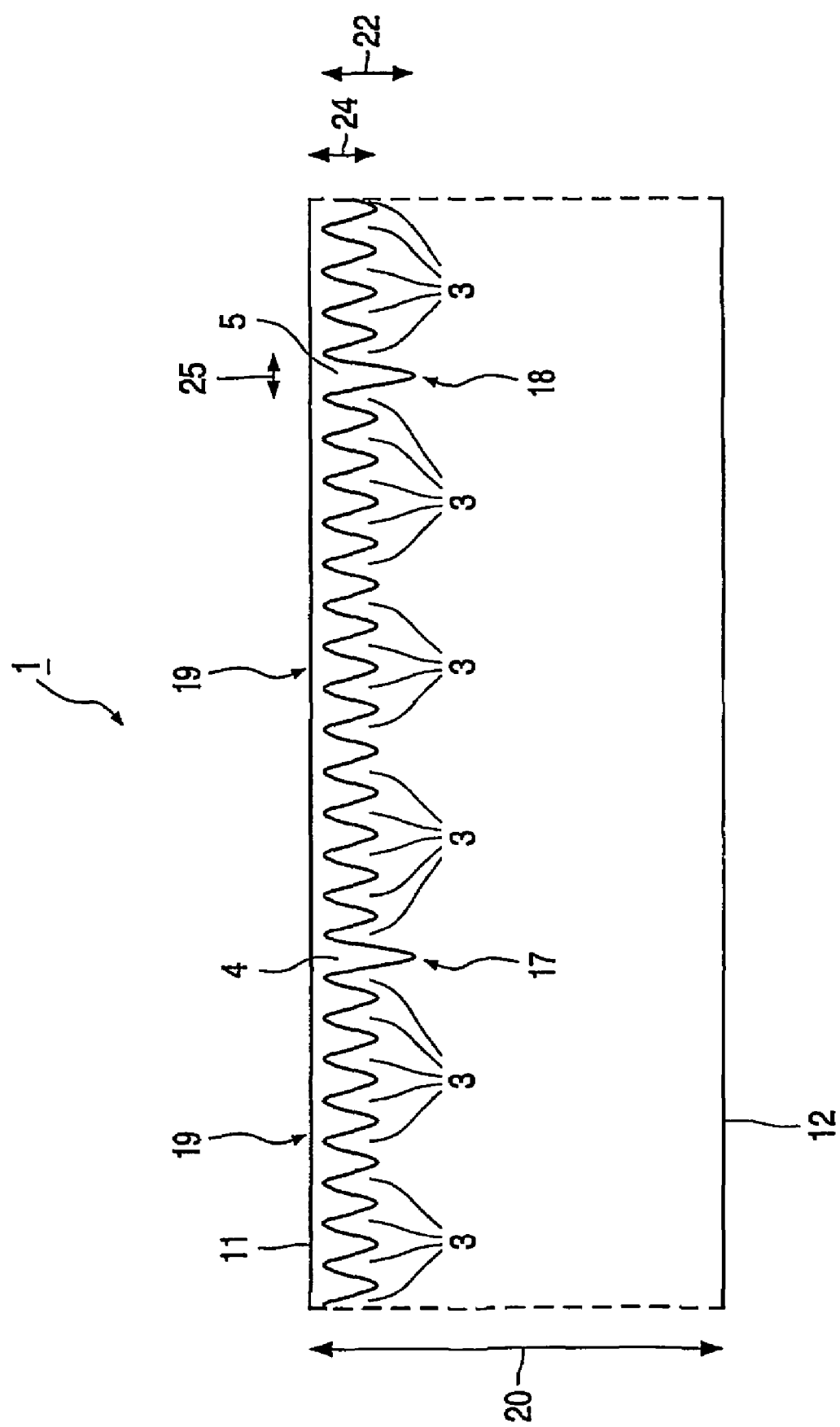
FIG. 3 is a cross-sectional view of a second embodiment of the substrate.

FIG. 3 is a diagrammatic cross-sectional view of a second embodiment of the substrate 1 according to the invention. The substrate 1 in this case comprises silicon—a 6-inch wafer—and is suitable for semiconductor devices. The thickness 20 of this silicon substrate 1 is 600 µm. In the Figure, the third groove 6 coincides with the plane of drawing. The grooves 4, 5, and 6 have a depth 24 of 100 µm and comprise a large number of protrusions 3. The grooves 4, 5, and 6 have a sawtooth structure as a result of this. The points of intersection 17, 18 of the grooves 4, 5, 6 each have a depression depth 22 of 150 µm. The grooves 4, 5, 6 have a width 25 of 80 µm at the first side 11 of the substrate 1. The initiation point 19 here is one of the protrusions 3. Which of the protrusions 3 will act as the initiation point depends on small differences in height between the protrusions 3, on material properties such as grain boundaries, and on variations in the pressure exerted during the method.

Embodiment 3

The substrate 1 has a thickness 20 of 0.38 mm. The substrate 1 comprises 96% $Al_2O_3$, 2% glass, and 2% pores. The material has a grain size of the order of 20 to 30 µm. The substrate had to be separated into components having a size of 15 by 45 mm. First, second, and third grooves 4, 5, 6 were provided at the first side 11 of the substrate 1 by means of a laser. A Coherent Diamond 84 225 W slab $CO_2$ laser with a wavelength of 10.6 µm was used. The distance between the first side 11 of the substrate 1 and the focus of the laser was 300 µm. The laser had a nozzle of 1 mm. Pulse times used were 150 and 250 µs, and the total pulse time was 2350 µs.

The pulsatory operation during the provision of the first groove 4 meant that points in the first groove 4 were skipped. These points remained as the initiation points 19 with protrusions 3. The first groove 4 had a sawtooth structure as shown in FIG. 3. The distance between mutually adjoining protrusions 3 was of the order of 125 to 175 µm. The depth 24 of the first groove was 60 and 30 µm in two consecutive experiments. An additional laser treatment was then applied to the first and second points of intersection 17, 18, such that depression depths of 90 µm and 60 µm, respectively, were achieved.

Embodiment 4

A substrate in accordance with embodiment 1 with a size of 20 by 70 mm comprised four components of 5 mm width each. These were broken in a four-point bending test carried out in a manner known to those skilled in the art. The inner span was 30 mm and the outer span 60 mm. Two breaking speeds were consecutively used during breaking, i.e. 1 mm/min and 5 mm/min. The fracture surfaces were subjected to a visual inspection. Surface marks demonstrated that the fracture is initiated in a—primary—initiation point where a protrusion with a top having an apex angle of approximately 100° was provided. A single fracture initiation in a second, less pronounced protrusion in the first groove does lead to a crack, but the fracture thus initiated coincides with the fracture initiated in the primary initiation point.

Embodiment 5

A substrate in accordance with embodiment 3 was subjected to a breaking test. The breaking speed used was 10 mm/min and 50 mm/min in different experiments. The substrate was subjected to a bending stress in the breaking test in a three-point bending arrangement which is known per se: the substrate was placed on a rigid steel carrier and covered with a thin, comparatively flexible coating layer. The coating layer is adhered to the substrate by means of an external pressure.

Depending on the distance between mutually adjoining protrusions, on the pulse duration, and the breaking speed, the pressure applied for breaking ranged from 80 to 180 MPa, measured as the Weibull strength in a manner known to those skilled in the art. The Weibull modulus lay between 14 and 26. The Weibull modulus is theoretically defined as $P_f/(\ln\sigma - \ln\sigma_0)$. $P_f$ is the failure probability, $\sigma$ the stress, and $\sigma_0$ the characteristic strength for which $P_f$ is equal to 63%. In proportion as the spread of the strengths of individual substrates increases, a decrease is found for the Weibull modulus. In proportion as the Weibull modulus is lower, the risk of deviation of a fracture surface from the desired fracture line becomes greater. A modulus of 20 or more is excellent in a three-point bending arrangement, a modulus of 15 is reasonable, a modulus of 10 is mediocre, and a modulus below 10 is poor. Separation widths of between 22 and 46 μm were obtained. These results were obtained from measurements of 30 substrates. A visual inspection of the substrates showed that no or hardly any deviations occurred with respect to the desired fracture surface. It was found that the fracture surface followed the course of the grooves also in the points of intersection and that no corners broke off. Further details are listed in Table 1.

Embodiment 6

A substrate was tested on an alternative breaking machine which had previously been calibrated and checked. The settings corresponded to those in experiment 1, where a Weibull strength of 115±7 MPa and a Weibull modulus of 20±2 were found. The alternative breaking machine gave a Weibull strength of 108±8 MPa and a Weibull modulus of 17±3. The conclusion is that the differences lie within the margin of error.

Embodiment 7

Substrates were tested for the influence of water by means of underwater tests. A Weibull strength of 115±7 MPa and a Weibull modulus of 20±2 were found for a substrate in accordance with embodiment 1 under the conditions of experiment 1. Under water, with all other conditions remaining the same, a Weibull strength of 95±6 MPa and a Weibull modulus of 20±4 were found. A Weibull strength of 147±8 MPa and a Weibull modulus of 23±4 were found under normal conditions for a substrate in accordance with the invention comprising 99.6% alumina. Under water, a Weibull strength of 122±8 MPa and a Weibull modulus of 18±3 were found. This leads to the conclusion that the differences between the values are caused by the instrument and not by the composition of the substrate. It further leads to the conclusion that water and/or moisture have no influence.

REFERENCE EXAMPLE 1

The substrate with a composition of 96% alumina, 2% pores, and 2% glass was tested in the three-point bending arrangement of embodiment 5. The substrate contained no grooves or other initiations. It had the same thickness and the same size as the substrate of embodiment 1. The test was carried out in the manner of experiment 1. A Weibull strength of $2\times10^3$ MPa and a Weibull modulus of 3 were found. A visual inspection showed that the fracture surface deviated from the desired fracture line in several locations.

REFERENCE EXAMPLE 2

Fracture initiations in the form of holes with an upside-down conical shape, a depth of 200 μm, and an interspacing of 200 μm were provided in the substrate of reference example 1. The substrate surface was planar in between the holes. A Weibull strength of 100±20 MPa and a Weibull

| no. | pulse time (μs) | energy supply (kJ/cm$^2$) | inter-spacing (μm) | breaking speed (mm/min) | Weibull strength (MPa) | Weibull modulus | separation width (μm) |
| --- | --- | --- | --- | --- | --- | --- | --- |
| 1 | 150 | 0.25 | 125 | 10 | 115 ± 7 | 20.2 ± 2.0 | not measured |
| 2 | 150 | 0.25 | 125 | 10 | 133 ± 8 | 20.6 ± 3.8 | 34.5 |
| 3 | 250 | 0.25 | 125 | 10 | 123 ± 6 | 24.1 ± 4.4 | 31.5 |
| 4 | 150 | 0.5 | 125 | 10 | 92 ± 4 | 26.7 ± 4.9 | 22.5 |
| 5 | 250 | 0.5 | 125 | 10 | 83 ± 5 | 18.8 ± 3.4 | 22.0 |
| 6 | 250 | 0.25 | 175 | 10 | 172 ± 11 | 19.8 ± 3.6 | 44.0 |
| 7 | 150 | 0.5 | 175 | 10 | 133 ± 12 | 13.4 ± 2.5 | 28.5 |
| 8 | 250 | 0.5 | 175 | 10 | 132 ± 8 | 20.1 ± 3.7 | 46.5 |
| 9 | 150 | 0.25 | 125 | 50 | 119 ± 8 | 17.3 ± 3.2 | 33.5 |
| 10 | 250 | 0.25 | 125 | 50 | 111 ± 7 | 19.3 ± 3.5 | 35.5 |
| 11 | 150 | 0.25 | 175 | 50 | 184 ± 16 | 14.1 ± 2.6 | 49.5 | modulus of 10±3 were found. A visual inspection showed deviations at the corners of the separated component.

The invention claimed is:

1. A substrate (1) with a first (11) and a second side (12) and a thickness (20), which substrate (1, 101) is provided at its first side (11) with:
    a first groove (4) having a depth (24) with respect to the first side (11), characterized in that the first groove (4) has a protrusion (3) in an initiation point (19) for forming a crack;
    a second (5) and a third groove (6), each having a depth (24) with respect to the first side (11), wherein
    the first groove (4) intersects the second and the third groove (5, 6) in a first and a second point of intersection (17, 18), respectively,
    the initiation point (19) lies between the first and the second point of intersection (17, 18), and
    the second and third grooves (5, 6) at the first and the second point of intersection (17, 18) are deepened to a depression depth (22) greater than the depth of the first, the second or the third groove.

2. A substrate (1) as claimed in claim 1, wherein the protrusion (3) has a top which encloses an apex angle of between 30 and 150 degrees.

3. A substrate (1) as claimed in claim 1, characterized in that the first groove (4) has several protrusions (3) between the first and the second point of intersection (17, 18).

4. A substrate (1) as claimed in claim 3, characterized in that the number of protrusions (3) is such that the first groove (4) substantially has a sawtooth structure between the first and the second point of intersection (17, 18).

5. A substrate (1) as claimed in claim 1, wherein the depth (24) of the first groove (4) is less than 25% of the thickness (20) of the substrate (1).

6. A substrate (1) as claimed in claim 1, wherein the depression depth (22) is at least one and a half times the depth (24) of the third groove (6).

7. A substrate as claimed in claim 1, wherein the second and the third groove (5, 6) are mutually oriented substantially at right angles, and in that the first and the third groove (4, 6) are substantially at right angles to one another.

8. A method of separating components from a substrate (1) with a first side (11) and a second side (12), comprising the steps of:
    providing a first groove (4) at the first side (11);
    providing a second (5) and a third groove (6), each having a depth (24) with respect to the first side (11), intersecting the first groove (4) the second and the third groove (5, 6) in a first and a second point of intersection (17, 18) respectively,
    forming an initiation point (19) between the first and the second point of intersection (17, 18), and
    deepening the second and third grooves (5, 6) at the first and the second point of intersection (17, 18) to a depression depth (22) greater than the depth of either the first, second or third grooves.

* * * * *